United States Patent
Yamada et al.

(10) Patent No.: US 7,318,785 B2
(45) Date of Patent: Jan. 15, 2008

(54) WORM GEAR DIFFERENTIAL

(75) Inventors: Silvio M. Yamada, Waterford, MI (US); Yakov Fleytman, Lake Orion, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 129 days.

(21) Appl. No.: 11/230,908

(22) Filed: Sep. 20, 2005

(65) Prior Publication Data

US 2007/0066437 A1    Mar. 22, 2007

(51) Int. Cl.
*F16H 48/28*    (2006.01)

(52) U.S. Cl. ...................................... 475/226

(58) Field of Classification Search ............... 475/220, 475/226, 251
See application file for complete search history.

(56) References Cited

U.S. PATENT DOCUMENTS 1,259,279 A  *  3/1918  Patch ........................ 475/220

1,407,703 A  *  2/1922  Moir ......................... 475/249

* cited by examiner

*Primary Examiner*—Sherry Estremsky
*Assistant Examiner*—Edwin A Young
(74) *Attorney, Agent, or Firm*—Carlson, Gaskey & Olds

(57) ABSTRACT

A differential includes a carrier and worm gear assembly that cooperate to provide speed differentiation between first and second output shafts as needed. The carrier is coupled to an axle input gear, such as a ring gear for example, or a transmission shaft. The worm gear assembly includes a first enveloping worm gear that drives the first output shaft and a second enveloping worm gear that drives the second output shaft. First and second gears are supported by the carrier and are each in meshing engagement with the first and second enveloping worm gears in a self-locking arrangement. When the first and second enveloping worm gears rotate they are able to turn the first and second gears during normal road conditions, however, the first and second gears cannot drive or turn the first and second enveloping worm gears during a low traction driving condition.

20 Claims, 3 Drawing Sheets

WORM GEAR DIFFERENTIAL

TECHNICAL FIELD

The subject invention relates to a differential that utilizes enveloping worm gears to achieve maximum traction.

BACKGROUND OF THE INVENTION

Vehicle drive axles typically include a pair of axle shafts for driving vehicle wheels. The drive axle uses a differential to control input speed and torque to the axle shafts. Under ideal conditions, when the vehicle is driven along a straight path under good road conditions, the vehicle wheels will be turning at approximately the same speed and the torque will be equally split between both vehicle wheels. When the vehicle negotiates a turn, the outer wheel must travel over a greater distance than the inner wheel. The differential allows the inner wheel to turn at a slower speed than the outer wheel as the vehicle turns.

A typical differential includes a differential housing that is driven by a final axle input gear, such as a ring gear. A differential spider is fixed to the differential housing and has four (4) support shafts, orientated in the shape of a cross, with each shaft supporting one differential pinion gear. The differential pinion gears are in meshing engagement with side gears that are splined to the axle shafts.

When the vehicle is driven in a straight path, the ring gear, differential housing, spider, and differential pinion gears all rotate as one unit to transfer power to the axle shafts. There is no relative movement between the differential pinion gears and the side gears. When the vehicle turns, the differential pinion gears rotate on their respective shafts to speed up the rotation of one axle shaft while slowing rotation of the other axle shaft.

Under certain driving conditions, such as wet or icy road conditions for example, standard drive axle differentials can cause wheels to slip and can ultimately lose capability to transmit torque. Often, a traction aid device is incorporated into a drive axle or differential to produce resistance to wheel slip. Optionally, a locking mechanism is incorporated into the differential to eliminate slip by providing a full differential lock condition. These traction aid devices and locking mechanisms require modification of existing components and/or require components to be added to the drive axle. This significantly increases cost for the drive axle. Additionally, these traction aid devices and locking mechanisms usually require hydraulic, electric, or pneumatic actuation, which increases complexity as well as further increasing cost.

There is a need for a differential that provides maximum traction during low traction conditions, but which does not require additional hydraulic, electric, or pneumatic traction aiding devices.

SUMMARY OF THE INVENTION

A differential includes a carrier driven by an input, first and second gears supported by the carrier, and first and second worm gears that are in meshing engagement with the first and second gears. The first and second worm gears drive first and second output shafts, respectively. The first and second gears cooperate with the first and second worm gears to provide speed differentiation between the first and second output shafts for turning and low traction driving conditions.

The first and second worm gears are enveloping worm gears that are coaxial with the first and second output shafts.

The enveloping worm gears include a spiral tooth formation that surrounds a worm axis of rotation defined by the first and second worm gears. The first and second gears include a plurality of gear teeth that are formed about an outer circumference of the first and second gears wherein the spiral tooth formation of the first and second worm gears is in direct meshing engagement with the plurality of gear teeth of the first and second gears.

The first and second gears are supported on first and second stub shafts, which are fixed to the carrier. The first and second gears can rotate freely about the first and second stub shafts, respectively. The first stub shaft defines a first axis of rotation and the second stub shaft defines a second axis of rotation. The first and second axes of rotation extend transversely relative to the worm axis of rotation and do not intersect the worm axis of rotation.

Mating interfaces between the first and second worm gears and the first and second gears are self-locking. When the first and second worm gears rotate, the first and second worm gears are able to drive the first and second gears, however, the first and second gears cannot initiate driving input into the first and second worm gears if these worm gears are not rotating. During normal driving conditions all components of the differential rotate together about the worm axis of rotation. During a loss of traction at one output shaft, for example the first output shaft, the first and second gears cannot drive the first worm gear, thus torque is not transferred to the first output shaft. Input torque from the carrier continues to supply torque to the second output shaft, i.e. the output shaft with traction.

The subject invention provides a differential that achieves maximum traction in low traction driving conditions without the need for additional hydraulic, electric, or pneumatic traction aiding devices. These and other features of the present invention can be best understood from the following specification and drawings, the following of which is a brief description.

DETAILED DESCRIPTION OF THE PREFERRED EMBODIMENT

Figure 1:
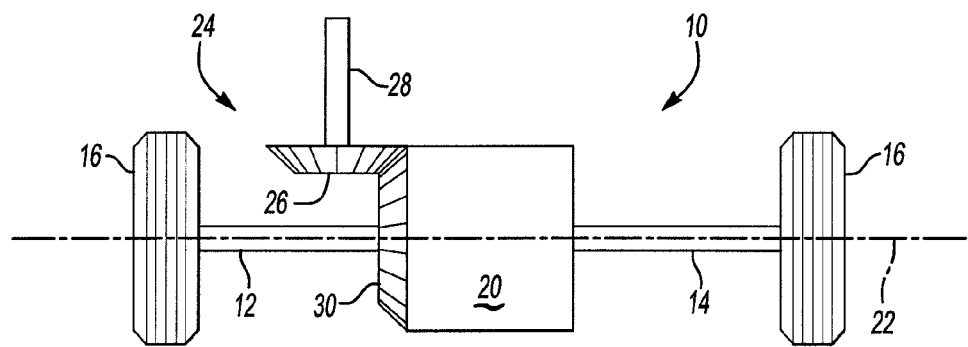
FIG. 1 is a schematic view of one example drive configuration for a differential incorporating the subject invention.

FIG. 1 shows a drive axle 10 with first 12 and second 14 axle shafts that drive vehicle wheels 16. The drive axle 10 includes a differential 20 to control input speed and torque to the first 12 and second 14 axle shafts. The first 12 and second 14 axle shafts define an axis of rotation 22 that extends laterally between the vehicle wheels 16.

Under ideal conditions, when a vehicle is driven along a straight path under good road conditions, the vehicle wheels 16 will be turning at approximately the same speed and the torque will be equally split between both vehicle wheels 16. When the vehicle negotiates a turn, the outer wheel must travel over a greater distance than the inner wheel. The differential 20 allows the inner wheel to turn at a slower speed than the outer wheel as the vehicle turns.

The differential 20 is also used to provide maximum available traction under poor driving conditions, such as wet or icy roads, for example. When one vehicle wheel is slipping, the differential 20 operates to supply available torque to the non-slipping wheel. This will be discussed in greater detail below.

In the configuration shown in FIG. 1, an axle input gear assembly 24 drives the differential 20. The axle input gear assembly 24 includes a pinion gear 26 that is driven by a driveshaft 28, and a ring gear 30 that is driven by the pinion gear 26. The ring gear 30 is attached to the differential 20, to drive or rotate the differential 20 about the axis of rotation 22. It should be understood that a pinion gear and ring gear configuration is just one example of an axle input gear assembly 24, and that other input gear configurations could also be used.

Figure 2:
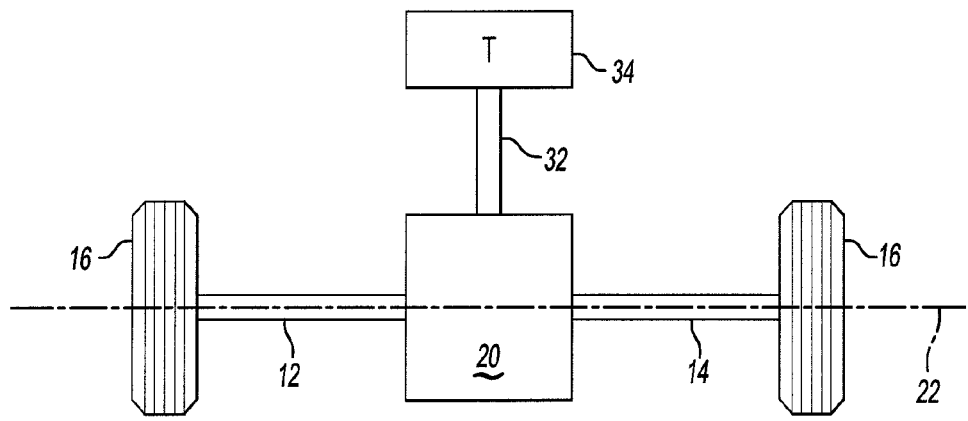
FIG. 2 is a schematic view of another example drive configuration for a differential incorporating the subject invention.

In the configuration shown in FIG. 2, the differential 20 is attached to a transmission shaft 32 from a vehicle transmission 34. The differential 20 drives the first 12 and second 14 axle shafts in the manner described above. It should be understood that the transmission shaft 32, as shown in FIG. 2, is just one example configuration and that the differential 20 could be driven by output shafts from other types of gear boxes.

Figure 3:
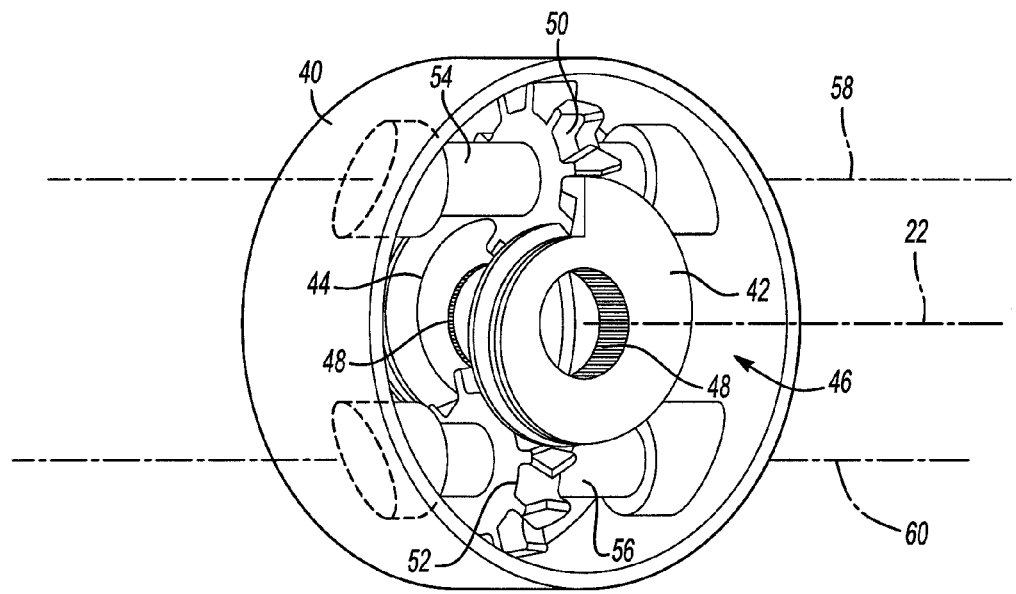
FIG. 3 is a perspective view of one embodiment of the subject differential.

The differential 20 is shown in greater detail in FIG. 3. The differential 20 includes a carrier 40 that is attached or fixed to a final axle gear, i.e. the ring gear 30 (FIG. 1) for example, or to the transmission shaft 32 (FIG. 2). The differential 20 includes a first worm gear 42 that is attached to drive the first axle shaft 12 and a second worm gear 44 that is attached to drive the second axle shaft 14. The carrier 40 is generally ring-shaped and defines an inner cavity 46. The first 42 and second 44 worm gears are mounted within the inner cavity 46. Input drive torque from the ring gear 30 or transmission shaft 32 is transferred to the first 42 and second 44 worm gears via the carrier 40.

Preferably, the first 42 and second 44 worm gears each include a center opening 48 with a splined surface that engages a respectively splined surface on the first 12 and second 14 axle shafts. While a splined connection is preferred, it should be understood that other attachment methods could also be used. Input drive torque to the first 42 and second 44 worm gears drives the first 12 and second 14 axle shafts, respectively.

The center opening 48 is preferably coaxial with the axis of rotation 22. Thus, the first 42 and second 44 worm gears and the first 12 and second 14 axle shafts are generally coaxial with each other and rotate together about a common axis of rotation 22.

The first 42 and second 44 worm gears are enveloping worm gears that are in direct meshing engagement with both of first 50 and second 52 gears that are supported by the carrier 40. A first shaft 54 supports the first gear 50 and a second shaft 56 supports the second gear 52. The first 54 and second 56 shafts are supported by the carrier 40 and are positioned within the inner cavity 46. The first 50 and second 52 gears are mounted such that the first 50 and second 52 gears can rotate freely about the first 54 and second 56 shafts.

The first shaft 54 defines a first shaft axis 58 and the second shaft 56 defines a second shaft axis 60. In the example shown in FIG. 3, the first 58 and second 60 shaft axes are spaced apart from each other and are generally parallel to each other. Further, in this example configuration, the first 58 and second 60 shaft axes are generally perpendicular to the axis of rotation 22 of the first 42 and second 44 worm gears. The first 58 and second 60 shaft axes are spaced such that the first shaft axis 58 is positioned on one side of the axis of rotation 22 and the second shaft axis 60 is positioned on an opposite side of the axis of rotation 22. The first 58 and second 60 shaft axes do not intersect the axis of rotation 22.

Figure 4:
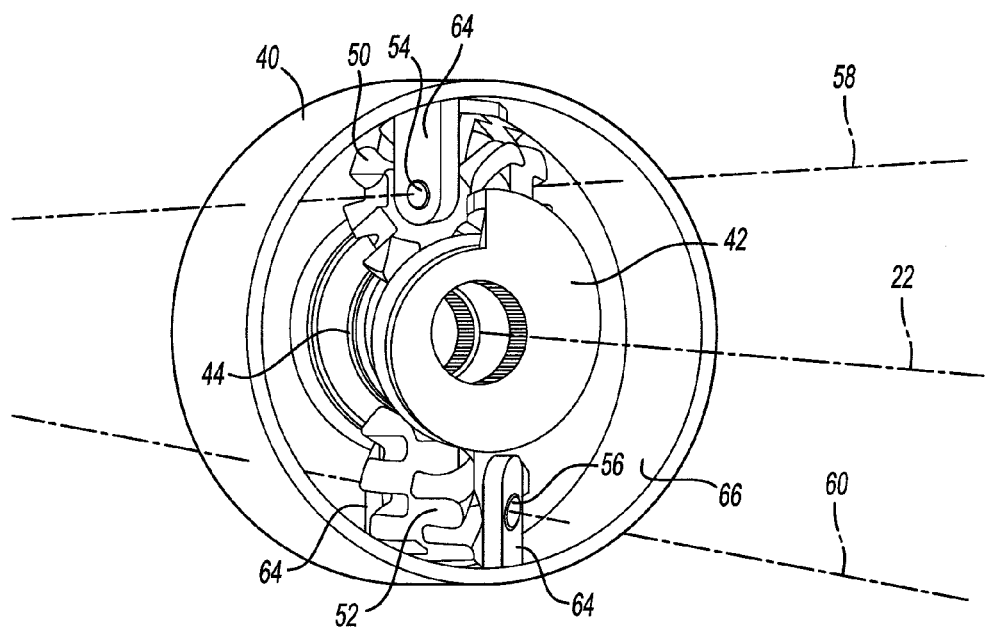
FIG. 4 is a perspective view of another embodiment of the subject differential.

In the example shown in FIG. 4, the first 58 and second 60 shaft axes are spaced apart from each other and are non-parallel relative to each other. Further, in this example configuration, the first 58 and second 60 shaft axes are arranged in a non-perpendicular relationship to the axis of rotation 22 of the first 42 and second 44 worm gears. Again, the first 58 and second 60 shaft axes are spaced such that the first shaft axis 58 is positioned on one side of the axis of rotation 22 and the second shaft axis 60 is positioned on an opposite side of the axis of rotation 22. The first 58 and second 60 shaft axes do not intersect the axis of rotation 22.

In the configuration shown in FIG. 4, the first 54 and second 56 shafts are mounted to support legs 64 that extend inwardly from an inner surface 66 of the carrier 40. These support legs 64 are positioned at different angles relative to the axis of rotation 22 defined by the first 42 and second 44 worm gears to provide the non-parallel arrangement of the first 50 and second 52 gears.

In either configuration, when the first 42 and second 44 worm gears rotate they are able to turn the first 50 and second 52 gears, but the first 50 and second 52 gears cannot turn the first 42 and second 44 worm gears. The first worm gear 42 and the first 50 and second 52 gears cooperate to define a first mating interface. The second worm gear 44 and the first 50 and second 52 gears cooperate to define a second mating interface. The first and second mating interfaces are self-locking.

Figure 5:
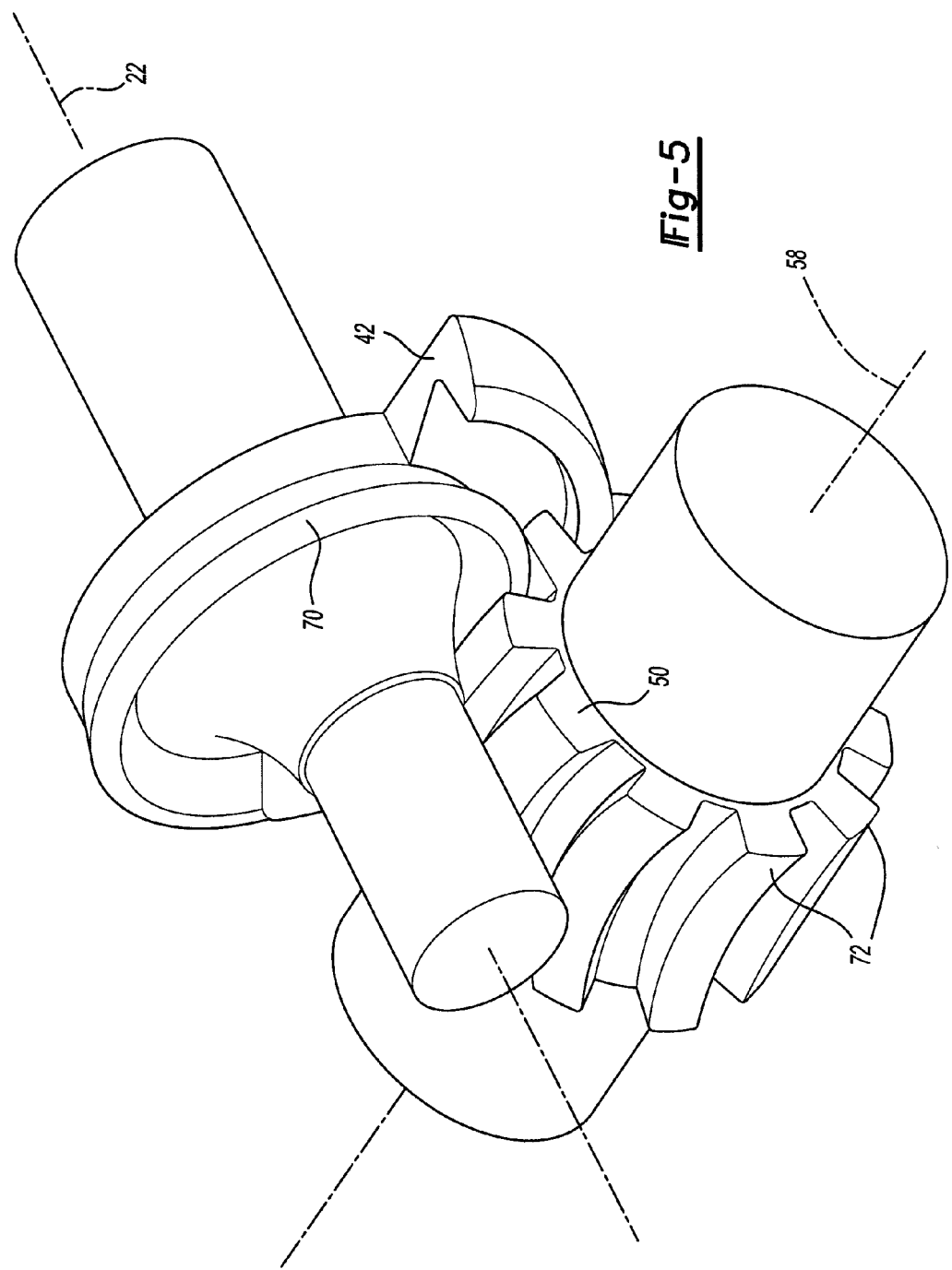
FIG. 5 is a perspective view of a worm gear assembly as used in the subject differential.

An example of a self-locking mating interface between the first worm gear 42 and one of the first 50 and second 52 gears is shown in FIG. 5. The interface between the second worm gear 44 and the first 50 and second 52 gears would be similarly configured. As discussed above, the first worm gear 42 is an enveloping worm gear that includes a spiral tooth formation 70. The spiral tooth formation 70 spirals about the axis of rotation 22 defined by the first worm gear 42.

The first 50 and second 52 gears each include a plurality of gear teeth 72 that are formed about an outer circumference of the first 50 and second 52 gears. Only the first gear 50 is shown in FIG. 5 for clarity purposes. The spiral tooth formation 70 is in direct meshing engagement with the plurality of gear teeth 72. Rotation of the first worm gear 42 in either direction drives the first gear 50 in a resultant direction. However, due to this meshing configuration, the first 50 and second 52 gears are incapable of initiating rotation of first 42 and second 44 worm gears when the first 42 and second 44 worm gears are not rotating.

During normal road conditions all components of the differential 20 (first 42 and second 44 worm gears, first 50 and second 52 gears, first 54 and second 56 shafts, carrier 40) rotate like one solid block around the axis of rotation 22 defined by the first 42 and second 44 worm gears. When any of the vehicle wheels 16 loose traction, for example a vehicle wheel 16 that is connected to the first worm gear 42, the first 50 and second 52 gears are about to rotate, but they cannot rotate because they cannot themselves initiate rotation of the second worm gear 44. Input torque from the carrier 40 will continue being supplied to the non-slipping wheel that is connected to the second worm gear 44. The balance of torque to left and right vehicle wheels 16 is automatically restored once both vehicle wheels are subjected to normal road conditions.

When the vehicle makes a turning maneuver, input motion from both vehicle wheels will rotate both the first 42 and second 44 worm gears. This will rotate the first 50 and second 52 gears to balance motion inside carrier 40, which allows one vehicle wheel to turn faster than the other vehicle wheel.

The subject invention provides a differential 20 having maximum traction during low traction conditions, but which does not require additional hydraulic, electric, or pneumatic traction aiding devices. Further, the subject differential 20 eliminates the need for friction components, such as bearings, bushings, etc., which also reduces overall cost. The subject differential 20 can be used in front or rear vehicle drive axles and could also be used as a central differential between front and rear drive axles, such as in a tandem configuration for example.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A differential assembly comprising:
   a carrier driven by an input;
   a gear set supported by said carrier, said gear set including only first and second gears supported by said carrier wherein said first gear is supported on a first stub shaft and said second gear is supported on a second stub shaft;
   a first worm gear in meshing engagement with said first and second gears;
   a second worm gear in meshing engagement with said first and second gears wherein each of said first and second worm gears comprises a single spiral tooth that spirals about a respective center of said first and second worm gears; and
   first and second outputs driven by said first and second worm gears wherein said first and second gears cooperate with said first and second worm gears to provide speed differentiation between said first and second outputs under predetermined conditions.

2. The differential assembly according to claim 1 wherein said first stub shaft is fixed to said carrier to support said first gear and a said second stub shaft is fixed to said carrier to support said second gear such that said first and second gears extend into a cavity positioned axially between end faces of said first and second worm gears.

3. The differential assembly according to claim 2 wherein said first and second gears rotate freely about said first and second stub shafts, respectively.

4. The differential assembly according to claim 2 wherein said first stub shaft defines a first stub shaft axis and said second stub shaft defines a second stub shaft axis and wherein said first and second worm gears define a worm gear axis, said first and second stub shaft axes extending transversely relative to said worm gear axis.

5. The differential assembly according to claim 4 wherein said first and second stub shaft axes are perpendicular to said worm gear axis.

6. The differential assembly according to claim 4 wherein said first and second stub shaft axes do not intersect said worm gear axis.

7. The differential assembly according to claim 4 wherein said first and second stub shaft axes are spaced apart from each other and parallel to each other.

8. The differential assembly according to claim 4 wherein said first and second stub shaft axes are spaced apart from each other and non-parallel to each other.

9. The differential assembly according to claim 4 wherein said first and second outputs comprise first and second output shafts that are coaxial with said worm gear axis.

10. The differential assembly according to claim 1 wherein said first and second gears each include a plurality of teeth formed about an outer circumference with said plurality of teeth being in direct meshing engagement with said single spiral tooth for both said first and second worm gears.

11. The differential assembly according to claim 1 wherein each of said first and second worm gears include a center opening for receiving said first and second outputs with said single spiral tooth spiraling about said center opening.

12. The differential assembly according to claim 1 wherein said input comprises one of an axle input gear and a transmission shaft.

13. The differential assembly according to claim 1 wherein said first and second outputs comprise first and second axle shafts adapted to drive first and second wheel assemblies.

14. The differential assembly according to claim 1 wherein said first worm gear only meshes with said first and second gears to form a first mating assembly and wherein said second worm gear only meshes with said first and second gears to form a second mating assembly, said first and second mating assemblies being self-locking.

15. The differential assembly according to claim 14 wherein said first and second worm gears are capable of driving said first and second gears when said first and second worm gears are rotating and wherein said first and second gears are incapable of initiating rotation of said first and second worm gears when said first and second worm gears are not rotating.

16. A differential assembly comprising:
   a carrier driven by an input;
   a gear set supported by said carrier, said gear set comprising only a first gear and a second gear that are spaced apart from each other in a generally vertical direction;
   a first worm gear in meshing engagement only with said first and second gears;
   a second worm gear in meshing engagement only with said first and second gears;
   a first stub shaft fixed to said carrier to support said first gear and a second stub shaft fixed to said carrier to support said second gear wherein said first stub shaft defines a first stub shaft axis and said second stub shaft defines a second stub shaft axis, and wherein said first and second worm gears define a worm gear axis, said first and second stub shaft axes extending transversely relative to said worm gear axis, with said first and second stub shaft axes being spaced apart from each other and non-parallel to each other; and
   first and second outputs driven by said first and second worm gears wherein said first and second gears cooperate with said first and second worm gears to provide speed differentiation between said first and second outputs under predetermined conditions.

17. The differential assembly according to claim 16 wherein said first and second worm gears each include a gear end face defining a center and a single spiral tooth spiraling about said center, and wherein said gear end faces of said first and second worm gears are spaced apart from each other by a cavity such that said first and second gears extend at least partially into said cavity.

18. A differential assembly comprising:

a carrier driven by an input;

a gear set supported by said carrier, said gear set including only a first gear supported on a first stub shaft and a second gear supported on a second stub shaft;

a first worm gear rotatable about an axis of rotation and in meshing engagement with said first and second gears, said first worm gear including a first gear end face defining a first worm gear center, and wherein said first worm gear includes a first single spiral tooth that spirals about said first worm gear center;

a second worm gear rotatable about the axis of rotation and in meshing engagement with said first and second gears, said second worm gear including a second gear end face defining a second worm gear center, and wherein said second worm gear includes a second single spiral tooth that spirals about said second worm gear center, said first and second gear end faces being axially spaced apart from each other along the axis of rotation to form a cavity, and wherein said first and second gears are supported by said carrier such that a portion of said first and second gears extends into said cavity; and first and second outputs driven by said first and second worm gears wherein said first and second gears cooperate with said first and second worm gears to provide speed differentiation between said first and second outputs under predetermined conditions.

19. The differential according to claim 18 wherein said first stub shaft defines a first stub shaft axis and said second stub shaft defines a second stub shaft axis, said first and second stub shaft axes being non-parallel to said axis of rotation, and wherein said first and second stub shaft axes are spaced apart from each other and non-parallel to each other.

20. The differential according to claim 18 wherein said first stub shaft defines a first stub shaft axis and said second stub shaft defines a second stub shaft axis, said first and second stub shaft axes being perpendicular to said axis of rotation, and wherein said first and second stub shaft axes are spaced apart from each other and parallel to each other.

* * * * *